United States Patent [19]

Romer et al.

[11] Patent Number: 4,939,952
[45] Date of Patent: Jul. 10, 1990

[54] CONNECTING ROD FOR AN AXIAL PISTON COMPRESSOR

[75] Inventors: Bendt W. Rømer; Kurt G. Jørgensen, both of Sønderborg, Denmark

[73] Assignee: Danfoss A/S, Nordborg, Denmark

[21] Appl. No.: 294,360

[22] Filed: Jan. 9, 1989

[30] Foreign Application Priority Data

Jan. 22, 1988 [DE] Fed. Rep. of Germany ....... 3801802

[51] Int. Cl.$^5$ .............................................. F16C 7/08
[52] U.S. Cl. ................................. 74/579 E; 92/157; 92/140; 29/888.092; 74/588
[58] Field of Search .................... 92/157, 187, 140; 74/579 R, 579 E, 579 F; 29/156.5 A; 123/197 AB

[56] References Cited

U.S. PATENT DOCUMENTS

| 3,822,609 | 7/1974 | Kotoc | 74/579 E |
| 4,369,742 | 1/1983 | Everts | 74/579 E |
| 4,480,498 | 11/1984 | König | 74/579 R |

FOREIGN PATENT DOCUMENTS

| 1273913 | 7/1968 | Fed. Rep. of Germany .... 74/579 E |
| 0173610 | 10/1982 | Japan ................................. 74/579 E |

Primary Examiner—Robert E. Garrett
Assistant Examiner—F. H. Stephan
Attorney, Agent, or Firm—Wayne B. Easton; Clayton R. Johnson

[57] ABSTRACT

There is provided a connecting rod for connecting a crank pin of an electric motor to a reciprocated piston. The connecting rod includes a sheet metal shaped member that at each end has a deep drawn cylinder mounting which in turn mounts a bushing that is of a greater axial length than the cylinder mounting. The shaped member has a longitudinal bead providing a depression extending adjacent to one of the mountings and terminate in spaced relationship to the other mounting whereby there is a planar surface extending transversely across the member longitudinally between the bead and the other mounting and adjacent to the widest part of the member to provide a bending line.

8 Claims, 1 Drawing Sheet

U.S. Patent     Jul. 10, 1990     4,939,952
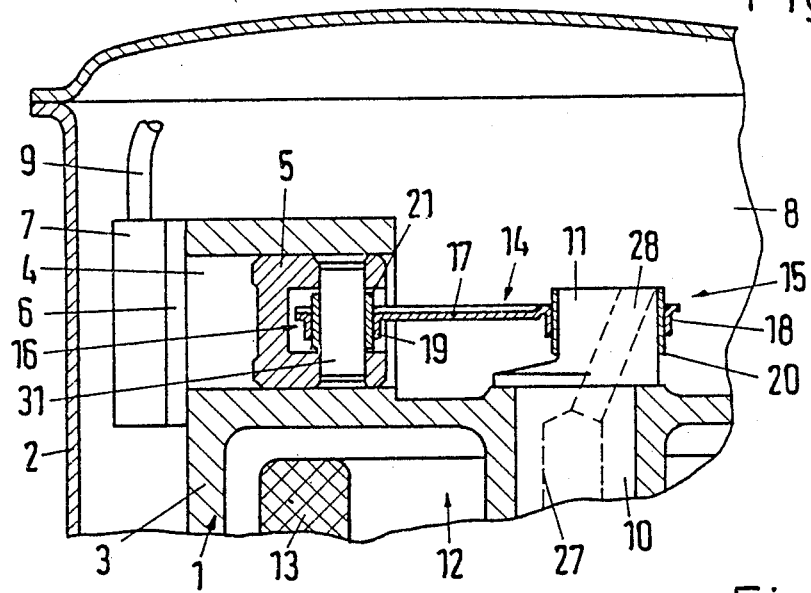
Fig.1
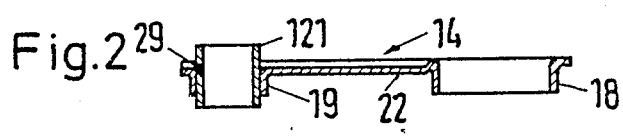
Fig.2
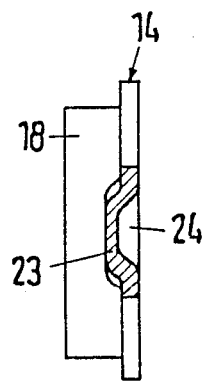
Fig.4
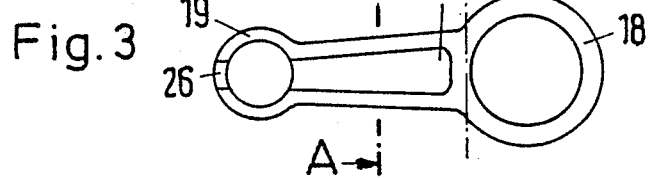
Fig.3
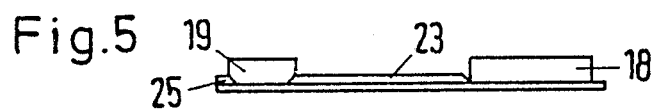
Fig.5
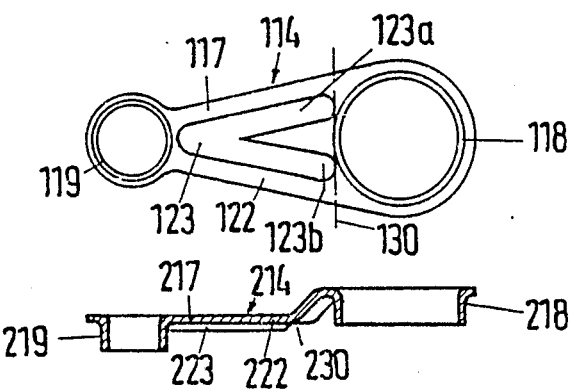
Fig.6
Fig.7

CONNECTING ROD FOR AN AXIAL PISTON COMPRESSOR

The invention relates to a connecting rod for an axial piston compressor, particularly a small hermetically sealed encapsulated regrigerator.

Such connecting rods are for example known from DE-OS 27 24 332. They are mounted with their head on the eccentrically running crank and with their eye on the piston pin. These two parts are interconnected by a rod-like central portion. Such a connecting rod must be strong because it is subjected to high bearing loads. It is therefore comparatively heavy. This is undesireable particularly in the case of hermetically encapsulated small refrigerators and also leads to more substantial vibrations.

More recently, connecting rods are made in one piece from a sintered metal because this material has good bearing properties and withstands large pressure loads. However, the manufacture of such a connecting rod consisting of two bearings and a connecting bar from sintered metal is a complicated and comparatively expensive process. In addition, the sintered metal is a very hard material. Even small inaccuracies in the assembly could have the result of the connecting rod extending not precisely at right angles to the crank shaft and the piston pin. This leads to edge pressures.

The invention is based on the problem of providing a connecting rod of the aforementioned kind that is low in weight.

This problem is solved according to the invention in that the connecting rod consists of a shaped sheet metal member with deep drawn cylinder mountings at both ends into which bushings of bearing material are inserted.

The sheet metal stamping is substantially lighter than known connecting rods. It can be made by a simple stamping and deep drawing process. Since sheet metal is less suitable for storage purposes, the bushing of bearing material are provided. They need subsequently only be inserted. This not only results in a low weight but also considerably reduced manufacturing costs. Vibrations in the compressor are reduced. In addition, the air resistance is lower. Further, it permits insertion of the bushings in the cylinder mountings and possibly also the formation of the thin-walled material of the sheet metal stamping to allow slight movement between the two bushings so that edge pressures are avoided.

In particular, the bushings can be made of sintered metal. This means that only a very small part of the entire connecting rod need be made of this material. The bushings are easy to make.

Preferably, the bushings are held in the cylinder mountings with a press fit. This results in secure retention.

It is recommended that the sheet metal section between the cylinder mountings has a substantially longitudinal extending strengthening bead. This gives the connecting rod a high strength despite the thinness of the sheet metal.

It is particulaly favourable for the sheet metal section between the cylinder sections to diverge towards the head of the connecting rod and for the strenthening bead to be bifurcated in the broad region. This leads to extraordinary high-strength in the direction of the pressure forces to be transmitted.

Advantageously, the depression of the strengthening bead passes through the bore of at least one of the cylinder mountings. This gives additional stiffening of the cylinder mounting at the position that is particularly subjected to the pressure forces.

This applies particularly to passing through the wall of the cylinder mounting for the eye of the connecting rod because at this position high-pressure forces have to be transmitted over a small area.

On the opposite side of the cylinder mounting there is preferably another bead of which the depression passes through the wall. In this way, the mounting is interrupted by the depression at two oppositely disposed positions. This facilitates tilting of the bushing inserted in the cylinder mounting.

In the case of a vertical motor shaft with the compressor at the top, the depression of the bead should point upwardly and form an oil collecting trough. With such motor shafts, oil is flung off at the end and this is caught by the depression. It can then be fed to the bearing positions in the eye or head of the connecting rod.

At least the bushing in the eye of the connecting rod should comprise an oil inlet bore which is fed by the oil collecting trough. The eye of the connecting rod, which is otherwise difficult to coat with oil, is in this way well lubricated and also cooled.

In this connection it is desireable for the oil inlet bore to be disposed at the side of the bushing remote from the central sheet metal section of the connecting rod. The oil inlet bore will therefore not weaken the bushing at the position which is subjected to most stress.

It is also favourable for the cylinder mountings to engage over only part of the axial length of the cylinder bushings. Any tilting forces that occur engage the bushing at a much larger spacing from the plane of the sheet metal than do the supporting forces in the cylinder mounting. This permits limited tilting movement and helps to avoid edge pressures.

In a preferred embodiment, the sheet metal shaped member is undeformed along a straight line running transversely to the centre line of the connecting rod. Bending is therefore easier along this straight line than in the sheet metal sections which are deformed by the cylinder mountings or the bead. Such bendability likewise reduces edge pressures.

Preferably, the straight line extends between the cylinder mounting of the head of the connecting rod and the strengthening bead.

Another embodiment provides for the cylinder mountings to be arranged in different planes and for the sheet metal section therebetween to have a step-like kink. By arranging the eye and head of the connecting rod in different planes, it is particularly possible to make best use of the space.

Preferred examples of the invention will now be described in more detail with reference to the drawing, wherein:

FIG. 1 is a longitudinal section through the upper portion of an encapsulated small refrigerator according to the invention, FIG. 2 is a section through the connecting rod of FIG. 1 with a modified bushing in the eye of the connecting rod, FIG. 3 is a plan view onto the connecting rod of FIG. 1, FIG. 4 is a section on the line A—A in FIG. 3 to a larger scale, FIG. 5 is a side elevation of the FIG. 1 connecting rod turned through 180°, FIG. 6 is an underplan of a modification, FIG. 7 is a longitudinal section through a further embodiment of the connecting rod.

FIG. 1 illustrates a motor compressor 1 which is hermetically sealed by a surrounding capsule 2. In a housing 3 there is a cylinder 4 in which a piston 5 can reciprocate. With the interpositioning of a valve plate 5, the cylinder is covered by a cylinder head 7 which sucks gaseous refrigerant from the interior 8 of the capsule 2 and delivers it to the outside through a pressure conduit 9.

The drive of the piston 5 is by way of a motor shaft 10 having a crank pin 11 and driven by an electric motor 12 of which the stator winding 13 is shown.

A connecting rod 14 has its head 15 mounted on the crank pin 11 and its eye 16 on a piston pin 31 so that the eccentric planatory motion of the crank pin 11 is converted to a reciprocating movement of the piston 5.

The connecting rod 14 consists of a sheet metal shaped member 17 with deep drawn cylinder mountings 18 and 19 at both ends into which respective bushings 20 and 21 of bearing metal, especially sintered metal, are inserted and retained with a press fit. These bushings have a slide fit on the crank pin 11 and piston pin 17 respectively and are axially longer than the cylinder mountings.

To stiffen the central sheet metal section 22 between the cylinder mountings, provision is made for a longitudinal bead 23 which extends substantially in the longitudinal direction and forms a depression 24 at the top. On the opposite side of the cylinder mounting 19, a bead 25 likewise has a depression 26 passing through the wall of the cylinder mounting.

This construction results in the bushing 21 being surrounded by the cylinder mounting 19 over only part of its length and for the axial covering to be reduced further in the region of the depressions 24 and 26. This permits tilting of the bushing 21 under the forces occurring during operation about the longitudinal axis of the connecting rod 14 to an extent necessary to avoid edge pressures. In addition, the cylinder mounting 19 is three-dimensionally supported at the transition to the central sheet metal section 22, which is particularly favourable at this position because here there is the largest load on the cylinder mounting 19.

The depression 24 of the bead 23 is, as is shown in FIG. 1, directed upwardly during operation. Consequently, oil flung downwardly through a conveying passage 27 and an oblique centrifugal outlet aperture 28 is partially received by the oil receiving trough formed by the depression. FIG. 2 shows that the bushing 121 in the eye 16 of the connecting rod has an oil inlet bore 29 on the side which is subjected to the least stress. Collected oil, which also reaches the region of the depression 26 along the circumference of the bushing 121, can be employed directly for lubrication between the piston pin 31 and bushing 121.

Between the bead 23 and cylinder mounting 18 there is a bending line indicated by a straight line 30 which extends perpendicular to the central longitudinal line of the connecting rod 14. There is no profiling of the sheet metal shaped member along this straight line 30. Whereas the entire remaining length has profiling produced either by a U-shaped cross-section of the bead 23 or by the cylinder mountings, the original plans of the sheet metal is here retained without change. For this reason, the sheet metal shaped member has the least resistance to bonding at this line. This means that slight inaccuracies in the alignment of the motor shaft axis and the cylinder axis can be balanced out by slight elastic deformation of the connecting rod. This likewise helps to avoid edge pressures. Since the straight line 30 is located where the sheet metal is broad, slight bending will not cause the connecting rod to break.

In the FIG. 6 embodiment, wherein corresponding parts are provided with reference numerals increased by 100, a shaped sheet metal member 117 is shown without bushings from below. On this occasion, the central sheet metal section 122 diverges more from the eye to the head of the connecting rod. For this reason, a bead 123 is provided which is bifurcated in the broader region to form two bifurcations 123a and 123b. This leads to still greater strength. Here, again, a straight line 130 is provided along which the sheet metal is undeformed and can therefore be bent more easily.

In FIG. 7, which uses reference numerals increased by 200, there is shown a modified connecting rod 214 in which the cylinder mounting 219 of the eye of the connecting rod is disposed in a different plane from the cylinder mounting 218 of the head. In this case, the central sheet metal section 222 has a step-like kink 230 which enables the difference in height to be obtained. Again, a bead 223 may be provided here.

Assembly may take place such that the bushing 21 is first pressed into the cylinder mounting 19. It is then brought into the interior of the piston 5, whereupon the piston pin 31 is introduced. It is advisable that the first piston bore (as viewed in the direction of pressing in) have a slide fit for the pin 31 so that the pin can be pushed through this inlet bore and the bushing 21 without exerting much force. The opposite piston bore then provides a press fit so that the pin 17 is securely held. The piston thus prepared is introduced in the cylinder 4, the play between the crank pin 11 and cylinder mounting 18 permitting the connecting rod 14 to be brought into position by turning the piston 5 about its axis. Finally, the bushing 20 is pressed into the cylinder mounting 18.

Many changes can be made from the illustrated examples without departing from the basic concept of the invention. For example, the connecting rod can also be employed in the vertical or an oblique plane. Normal deep drawn steel of Quality 2 is suitable as a material for the shaped sheet metal member. Different pressures can be readily taken into account by selecting the strength of the sheet metal and the profiling. The oil supply illustrated for the bushing 19 can also be provided for the bushing 18.

We claim:

1. A connecting rod for an axial piston compressor, particularly a small hermetically sealed encapsulated refrigerator, comprising a sheet metal member having a longitudinal intermediate portion, a deep drawn cylinder mounting first end portion joined to the intermediate portion and a deep drawn cylinder second end portion joined to the intermediate portion opposite the first end portion and longitudinally offset from the first end portion, a first bushing extending within the first end portion and a second bushing extending within the second end portion, each bushing being made of a bearing material and extending axially in abutting relationship with the respective cylinder mounting end portion, the intermediate portion diverging in a direction away from the first end portion toward the second end portion and having a generally longitudinally extending strengthening bead, the bead having bifurcated legs that diverge in a direction toward the second end portion.

2. A connecting rod for an axial piston compressor, particularly a small hermetically sealed encapsulated refrigerator, comprising a sheet metal member having a longitudinal intermediate portion, a deep drawn cylinder mounting first end portion joined to the intermediate portion and a deep drawn cylinder second end portion joined to the intermediate portion opposite the first end portion and longitudinally offset from the first end portion, a first bushing extending within the first end portion and a second bushing extending within the second end portion, each bushing being made of a bearing material and extending axially in abutting relationship with the respective cylinder mounting end portion, the intermediate portion having a longitudinally extending strengthening bead and the first end portion having a first depression opening to the first bushing and to the bead.

3. A connecting rod according to claim 2, characterized in that the first end portion has a second depression that opens to the first bushing diametrically opposite the first depression.

4. A connecting rod according to claim 3 wherein the first bushing is adapted for being mounted on a piston pin and the second bushing is adapted for being mounted on a vertical motor shaft, characterized in that the bead forms an oil collecting trough.

5. A connecting rod according to claim 4, characterized in that the first end portion has a depression forming a continuation of the oil trough and opening to the first bushing and that the first bushing has an oil entry bore that opens to the first end portion depression.

6. A connecting rod according to claim 5, characterized in that the oil entry bore opens to the oil trough continuation diametric opposite the intermediate portion.

7. A connecting rod for an axial piston compressor, particularly a small hermetically sealed encapsulated refrigerator, comprising a metal member having a longitudinal intermediate portion, a deep drawn cylinder mounting first end portion joined to the intermediate portion and a deep drawn cylinder second end portion joined to the intermediate portion opposite the first end portion, a first bushing extending within the first end portion and a second bushing extending within the second end portion, each bushing being made of a bearing material and extending axially in abutting relationship with the respective cylinder mounting end portion, the intermediate portion having a longitudinally extending strengthening bead forming an oil collecting trough and the first end portion having a depression forming a continuation of the oil trough and opening to the first bushing.

8. A connecting rod according to claim 7, characterized in that the first bushing is adapted for being mounted on a piston pin and the second bushing is adapted for being mounted on a vertical motor shaft, characterized in that the first end portion has a depression forming a continuation of the oil collecting trough and that the first bushing has an oil entry bore that opens to the first end portion depression.

* * * * *